Aug. 1, 1967  H. S. AUSHERMAN ET AL  3,333,348
GRAIN DRYING APPARATUS

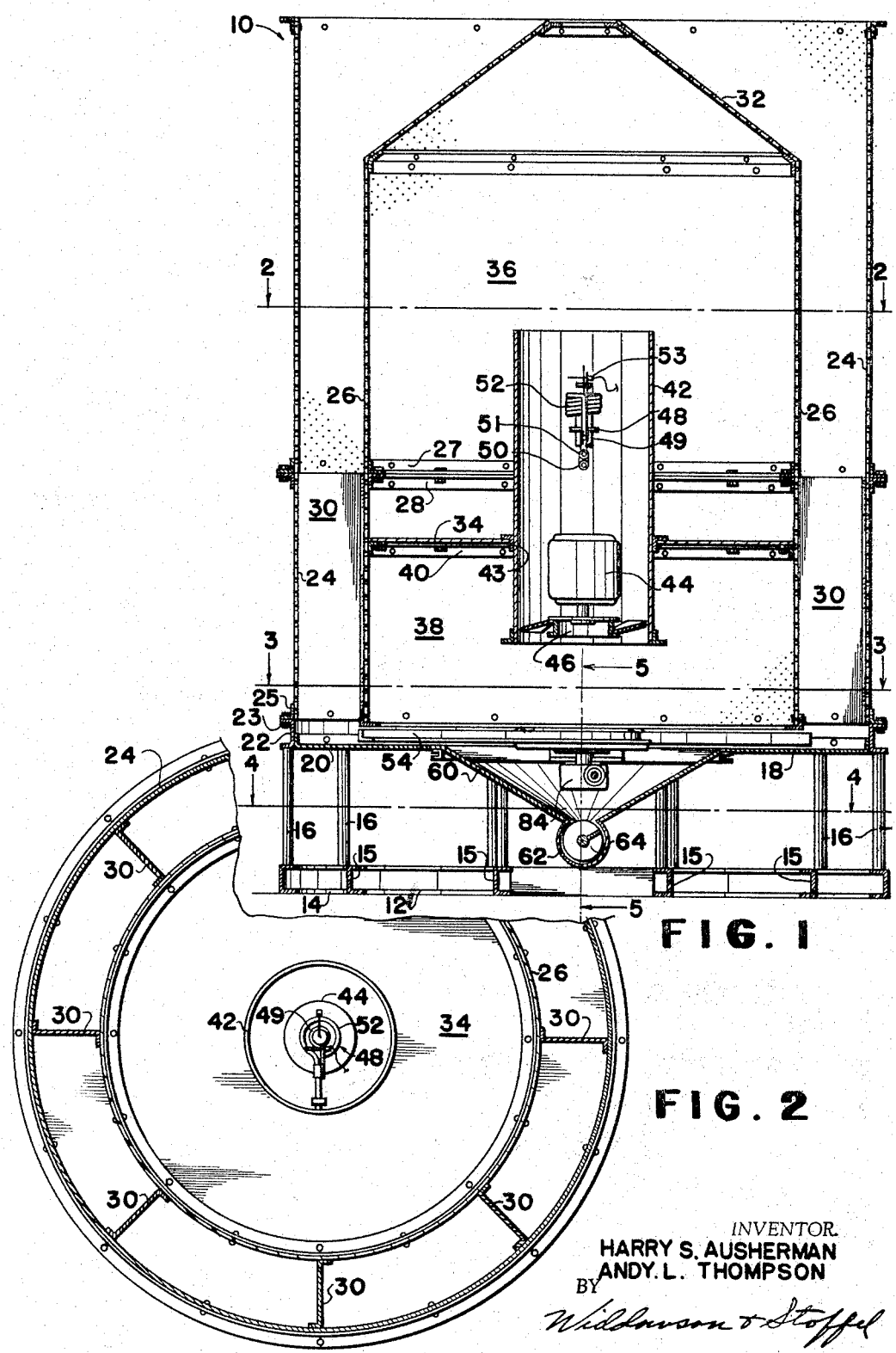

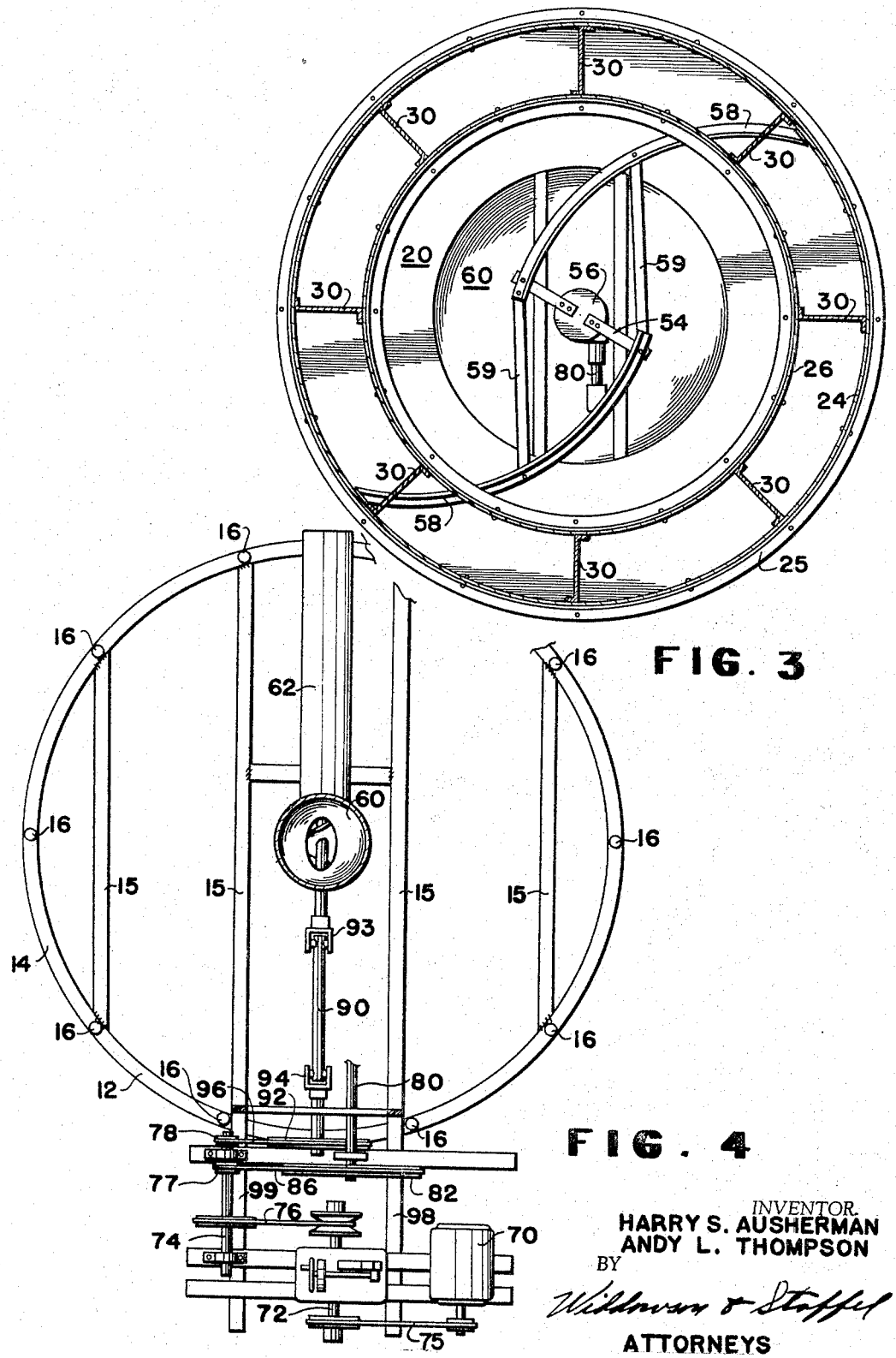

Filed March 8, 1965  3 Sheets-Sheet 3

INVENTOR.
HARRY S. AUSHERMAN
ANDY L. THOMPSON
BY
*Widdowson & Stoffel*
ATTORNEYS

3,333,348
GRAIN DRYING APPARATUS

Harry S. Ausherman, Wichita, and Andy L. Thompson, Courtland, Kans., assignors to Wichita Supply and Manufacturing Co., Inc., Wichita, Kans.
Filed Mar. 8, 1965, Ser. No. 437,719
6 Claims. (Cl. 34—174)

This invention relates to the drying of materials, more particularly to drying of grains. More specifically, the invention relates to apparatus for drying grain and other divided materials, which apparatus is adapted to dry divided materials in a continuous cycle of operation.

The removing of moisture from grain and other divided materials is very desirable, and in some instances imperative to prohibit the growth of mold and decay material. When grain and other crops are not consumed or suitably processed immediately after harvest, drying has always been a popular and practical method of preservation. Further, in the processing of grain, as for example the production of flour, cattle feed, etc., the moisture content in the grain must be reduced to a suitable level. Also very often the cash price for grain varies inversely in proportion to its moisture content. For these reasons it is very often economically feasible for farmer processors, and handlers of grain, and other products, to own or have ready access to drying equipment which is efficient and capable of reducing the moisture content in grain and other materials. Apparatus for drying grains, etc. have been developed and used but the known apparatus have not met with general acceptance, outside of very large farm operations or storage elevators. The known drying apparatus for grains and other divided materials are in general very large and expensive permanent installations which require specialized knowledge and skill in order to operate. The average farmer and small grain handler operator have not extensively engaged in the drying of grains. The known drying apparatus generally requires a specialized technical knowledge for proper operation, which knowledge is generally not possessed by a small farm operator, or handler of grains.

While box wagons, suitable for small scale drying operations equipped with perforated floors spaced above a solid floor are known, which wagons can be connected to an air duct, this equipment has not proven entirely satisfactory. The process is quite slow, requires a great deal of manual control and adjustment, and ties up equipment during the busy harvest season. Also the grain is not dried uniformly through each level, and the moisture content can not be accurately controlled.

Very often with drying equipment known to the prior art, a current of very warm or hot air is passed through the grain thus heating the grain to a relatively high temperature. Normally a great deal of this heat must be removed before the grain is stored in order to insure that the seed will germinate, and also to reduce the fire hazard in the event that insufficient moisture is not removed and heat is subsequently generated. In general, the grain drying apparatus known to the prior art does not include a simple relatively inexpensive drier which can be utilized by a small operator which is largely automatic in operation and which will produce uniform consistant results. Further, the known grain driers do not have facilities to very quickly and efficiently cool the grain to a suitable temperature after it has been dried with a current of very warm air.

We have invented a new grain drier. The grain drier of our invention has spaced pervious walls adapted to receive therebetween material to be dried with a chamber formed at least in part by one of the walls. A duct is provided having an outlet within the chamber. A blower means is connected to the duct for providing a current of air across the spaced pervious walls. A means is also provided to remove material disposed between the spaced perforate walls.

In a preferred specific embodiment of our invention, the chamber is divided into two compartments with an imperforate partition. The duct means communicates with opposite sides of the partition and in use transfers air from one side of the partition to the other to thereby draw air through a portion of the spaced pervious walls, and expels air through another portion of the spaced pervious walls. Preferably a burner means or other means for adding heat is also provided in the duct.

The drier apparatus of our invention solves all of the problems associated with drying apparatus known to the prior art. Our drier apparatus has a continuous cycle of operation which will quickly, efficiently and uniformly dry grains and other threaded materials. The drier apparatus of our invention also is very simple to operate and is relatively inexpensive. It is particularly adapted for use by farmers and relatively small handlers of grain, but could also be very advantageously used by large elevators or grain handlers. In the grain dryer of our invention an improved means is provided to remove the grain at a uniform rate from between the spaced pervious walls after it has been dried, and convey it to a desired location, as for example, to a storage unit, wagon, vehicle, etc. The means for removing the grain is adapted to utilize a single source of power, as for example an electric motor, thereby reducing the size of the capital investment involved. In a preferred specific embodiment of the grain drier of our invention, grain is dried with a current of heated air, and immediately thereafter cooled by a current of cool air, prior to its removal from the spaced pervious walls. The grain upon leaving the drying apparatus can be deposited directly to any suitable storage means. Further, the apparatus of our invention can be very easily adjusted to vary moisture content of the dried grain by varying the rate the grain is passed through the apparatus, and the temperature of the current of air, to thereby enable the apparatus to be used under the widely varying conditions and meet varying moisture content demands. The apparatus of our invention can also be very easily and quickly disassembled for maintenance and/or repair.

An object of this invention is to provide a new grain drying apparatus.

Still another object of our invention is to provide an improved grain drying apparatus having a continuous cycle of operation and which is largely automatic in operation.

Another object of our invention is to provide a grain drying apparatus which is practical for the average farmer or small grain handler operator.

Yet another object of the invention is to provide a drying apparatus which in use will condition the material being dried enabling the dried material to be deposited directly into a storage bin.

Yet another object of this invention is to provide improved agitator and conveyor apparatus for grain driers which will in use automatically and efficiently remove grain from the drying area at a uniform rate.

Another object of the invention is to provide a grain dried which in use will dry the grain with a hot current of air and immediately thereafter cool the resultant hot dry grain with a cool current of air.

Another object of this invention is to provide a grain drier that is largely automatic in operation, and which can be adjusted to meet varying moisture content requirements.

Another object of this invention is to provide a grain drier apparatus that is relatively inexpensive to produce and to operate.

Another object of this invention is to provide an improved drier apparatus that will consistantly produce uniform results.

Other objects and advantages of the new drying apparatus of our invention will become apparent to those skilled in the art upon reading the disclosure. Drawings accompany and are a part of this disclosure. These drawings depict preferred specific embodiments of the new drying apparatus of our invention, and it is to be understood that such drawings are not to unduly limit the scope of our invention. In the drawings:

FIG. 1 is a view in vertical cross section of a preferred specific embodiment of the grain drying apparatus of our invention.

FIG. 2 is a cross sectional view taken on line 2—2 of FIG. 1.

FIG. 3 is a cross sectional view taken on line 3—3 of FIG. 1.

FIG. 4 is a cross sectional view taken on line 4—4 of FIG. 1.

Figure 5:
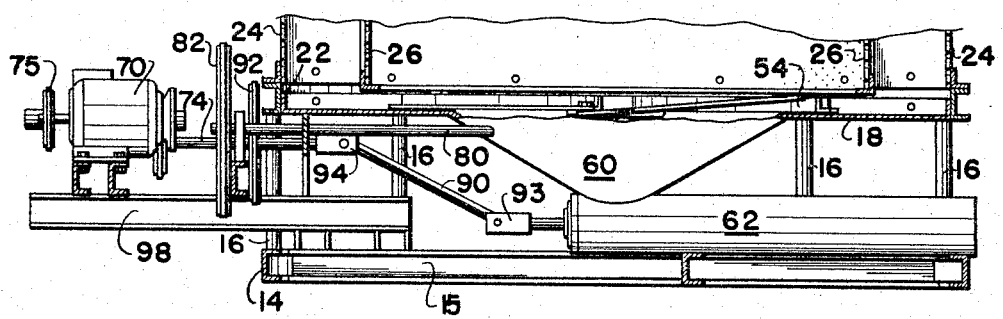
FIG. 5 is a side elevational view, in broken section, illustrating structure of the improved agitator and conveyor means of our invention.

The following is a discussion and description of the new grain drying apparatus of our invention, made with reference to the drawings, wherein the same reference numerals are used to indicate the same or similar parts and/or structure. The discussion and description is of preferred specific embodiments of the new drier apparatus of our invention, and it is to be understood that such is not to unduly limit the scope of our invention.

Referring now to the drawings, FIGS. 1 through 5 there is shown a preferred specific embodiment 10 of the drier apparatus of our invention.

The grain drier 10 has a base 12 consisting of a circular channel iron 14 with spaced cross braces 15 positioned in chord relation to channel iron 14. A plurality of spaced upright legs 16 are mounted on base 12. A metering means is mounted above base 12 to remove material from the drier 10 at a constant controlled rate. The operation and structure off the metering means includes a housing 18, and a rotatable element provided with metering arms overlying the housing, which will be described in detail in the description that follows. Since the material operated upon by the metering means is also agitated, the elements of the metering means will be hereinafter described in terms of "agitator" elements. Agitator housing 18 is mounted on the legs 16 having a flat annular shaped floor 20 connected to a relatively short upright cylindrically shaped upright wall 22. The top portion of upright wall 22 is provided with an outwardly extending flange 23, as clearly indicated in FIG. 1. An upright perforated cylindrically shaped outer wall 24 is secured to the agitator housing 18. Outer wall 24 is preferably provided with an outwardly extending flange 25 on the lower end which is bolted to flange 23 of agitator housing 18. The outer wall 24 can be made in upper and lower sections with the sections joined by outwardly extending flanges bolted together. An upright perforated cylindrically shaped inner wall 26 is positioned in spaced and concentric relation to outer wall 24. Outer and inner walls can be formed in any suitable shape. For example, the walls can have a hexagonal, octagonal, etc. configuration. The inner wall 26 is of a height less than the outer wall. Inner wall 26 is preferably made in two sections, namely an upper section and a lower section which sections are provided with inwardly extending flanges 27 and 28 which are also bolted together. Outer and inner walls 24 and 26 are preferably perforated steel plate. The size and spacing of the holes in the plate are selected to best accommodate the material intended to be dried in the apparatus.

For example, the holes can be $3/32$ of an inch in diameter and positioned on $5/32$ of an inch centers. Alternately, the walls 24 and 26 could be made of heavy screen material or other pervious material if desired. As shown in FIG. 1 the bottom end of inner wall 26 is spaced a distance above floor 20 of agitator housing 18. The reason for such spacing will be evident in the description that follows. A plurality of upright circumferentially spaced flat structural members 30 are secured to outer wall 24 and inner wall 26 as more clearly shown in FIG. 2 of the drawings. Structural members 30 are secured along the inside vertical edges to the inner wall with the lower end positioned in spaced relation to the floor 20 of agitator 18, and the outside vertical edges to the outer wall 24. A frusto-conical shaped diverter hood 32 is secured to the top edge of the inner wall, as most clearly shown in FIG. 1. It can be seen that the diverter hood 32 forms with the outside wall 26 a hopper adapted to receive and hold a quantity of material to be dried. The outside wall can be extended upwardly to increase the capacity of the hopper, if desired.

The inside wall 26 and hood 32 form an enclosure. An annular shaped flat horizontal partition 34 of imperforate material is secured to the inner wall 26 to divide the enclosure into upper and lower chambers 36 and 38. The partition 34 is preferably of sheet metal, which is secured to the inner wall 26 by bolting same to flange 40 in turn secured to inner walls 26. A cylindrically shaped duct 42 is mounted in a vertical position in the central aperture 43 of partition 34. A blower is mounted on the lower end of duct 42, as most clearly indicated in FIG. 1. The blower is adapted to transfer air from the lower chamber 38 to the upper chamber 36, and has a motor 44 with a horizontally disposed fan 46 connected thereto. The motor is suitably secured to the duct 42 and wiring means adapted to conduct electricity to the motor 44 provided.

A burner 48 is mounted in the upper portion of duct 42. Burner 48 has a cylindrically shaped firing chamber 49, a conduit for compressed air 50, and a conduit 51 for fuel. Preferably the fuel is heated by passing same through a coil 52 disposed about the firing chamber 49 prior to its introduction into the chamber. An ignitor 53 is also preferably provided on the burner 48. The burner is known in the art. If desired any other suitable type of burner or heating means can be substituted for burner 48. Further, in certain instances, depending on the intended use of the drying apparatus, the burner can be deleted. It can be seen that the blower will in use draw a current of cool air from the exterior across the annular space between 24 and 26 into compartment 38, in the area below partition 34, and direct the air upwardly past burner 48 and into the upper compartment 36. The heated air in the upper compartment 36 will then be forced across the annular space between outer and inner walls 24 and 26 above partition 34 to heat and dry the grain contained therein. In use the grain in the annular space above partition 34 is heated and dried, and subsequently cooled in the space below partition 34.

An agitator 54 is mounted in agitator housing 18. The agitator 54 is rotatable about a vertical central axis and has a hub 56, a plurality of arcuate shaped arms 58, and brace means 59 securing the arms to the hub in rigid relation with the outer ends of the arms 58 moving in close but spaced relation to the outer wall 22 to agitator housing 18.

A frusto-conical shaped hopper 60 is connected to the floor 20 along the central aperture and positioned to receive dried material from the annular space between walls 24 and 26. A tubular shaped conveyor housing 62 is connected to the outlet opening of hopper 60 to receive material therefrom. A conveyor auger 64 is rotatably disposed in conveyor housing 62. It can be seen that the agitator 54, when rotated, will remove dried material from the lower portion of the annular space between the inner and outer walls and deposit it in the hopper 60.

The material will then be received in the conveyor housing 62 and conveyed outwardly by conveyor auger 64. In general, the rate of removal of material from between the outer walls 24 and 26 is directly proportional to the rotational velocity of agitator 54.

A power means for the agitator 54 and conveyor auger 64 is provided and illustrated in detail in FIGS. 4 and 5 of the drawings. The power means includes an electric motor 70, a first shaft 72, and a second shaft 74. Motor 70 is connected to shaft 72 in driving relation by belt 75, and shaft 72 is connected to shaft 74 by belt 76. Pulleys 77 and 78 are mounted on shaft 74 in spaced relation. An agitator drive shaft 80 is disposed in generally parallel relation to shaft 74, and is provided with a pulley 82 on one end thereof. The other end of agitator drive shaft 80 is connected in driving relation to an agitator gear box 84 having a vertically disposed drive shaft connected to the hub 56 of agitator 54. A belt 86 is disposed on pulley 77 and pulley 82 to thereby complete the power from motor 70 to agitator 54. The speed that the agitator is rotated can be very simply changed by changing pulleys to provide the desired mechanical advantage, or by substituting a transmission or the like in the drive chain. It is understood that chains and sprockets, or gears, can be substituted for the pulleys and belts if desired.

A conveyor drive shaft 90 is provided having a pulley 92 mounted on one end thereof. The opposite end of conveyor drive shaft 90 is connected to the auger 64 disposed in conveyor housing 62. Two universal joints 93 and 94 are disposed in the conveyor drive shaft 90 to provide for misalignment for the portion of the shaft 90 having the pulley 92 mounted thereon, and the longitudinal axis of the auger. By providing the universal joints 93 and 94 the conveyor housing can be inclined and swiveled at various angles if necessary or desirable. A belt 96 is disposed on pulleys 78 and 92 to complete the driving connection between motor 70 and the conveyor auger 64. The various shafts are mounted on two elongated channel shaped beams 98 and 99 in turn mounted on the circular channel shaped member 14 of base 12.

Figure 6:
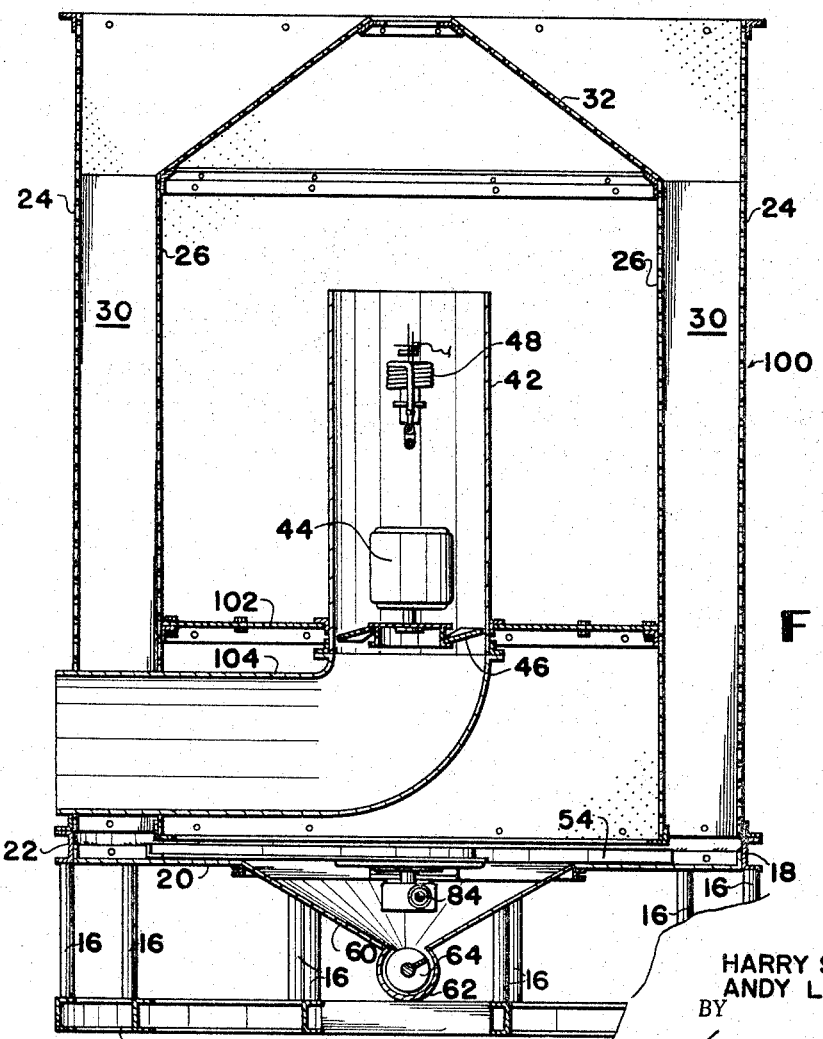
FIG. 6 is a view, in vertical cross section, of another preferred specific embodiment of the grain drying apparatus of our invention.

In FIG. 6 is shown another embodiment 100 of our grain drier apparatus. The grain drier 100 has a base 12 having upright legs mounted thereon, and an agitator housing mounted on legs 60. The agitator housing, base, and legs are generally similar to the comparable elements in the embodiment 10 described previously. Outer and inner cylindrically shaped perforated walls 24 and 26 are provided and spaced in concentric relation, with the height of the outer wall 24 being greater than the height of the inner wall 26. A plurality of circumferentially spaced structural members 30 are provided to secure the outer and inner walls 24 and 26 in spaced relation. A frusto-conical shaped diverter hood 22 is mounted on the top of inner wall 26 to form a chamber. Preferably the diverter hood is of pervious material such as sheet metal.

A cylindrically shaped vertically disposed duct 42 is mounted within inner wall 26 and hood 32, preferably in a vertical position. Suitable support means 102 are provided to support the duct 42 in the chamber. The support means can be of any suitable construction, as for example a plurality of radiating bars affixed to the inner wall 26 and to the duct 42. The support means 102, in contrast with the partition 34 shown in embodiment 10, will allow the air in the chamber to circulate freely. Similarly, as in the embodiment 10, a burner 48 is mounted in the top of duct 42 and a blower in the lower portion. An inlet duct 104 is provided which extends through the outer and inner walls 24 and 26 and is in communication with the lower end of vertically extending duct 42. It can be seen that the blower will draw air in directly from the outside, heat the air by passing same past burner 48, and force the heated air outwardly through and across the inner and outer perforated walls 26 and 24 to dry grain disposed therebetween. In this embodiment of our invention heated air is blown outwardly through the grain being dried throughout the overall length of the spaced walls. An agitator 54 is disposed in the agitator housing 18 in basically the same manner as described in the previous embodiment. Further, a hopper 60 and conveyor are mounted on agitator housing and a means for driving the agitator and conveyor is provided. This structure is similar to the structure shown and described in connection with the grain drier 10, and will not be described in detail.

As will be obvious to those skilled in the art, various changes and modifications of the preferred drawing apparatus and subcombinations of our invention as described herein can be made or followed without departing from the spirit of the claims or the scope of the disclosure or the scope of the claims.

We claim:

1. Apparatus for drying grain comprising, a base, upright legs mounted on said base, an agitator housing mounted on said legs having a short upright cylindrical shaped wall, and a flat annular shaped floor, an upright, relatively high, perforated cylindrically shaped outer wall secured to said short wall of said agitator housing, an upright perforated cylindrically shaped inner wall positioned in spaced and concentric relation to said outer wall of a height less than said outer wall, a plurality of upright circumferentially spaced flat structural members secured along the outside vertical edges to said outer wall, and secured along the inside vertical edges to said inner wall with the lower end positioned in spaced relation to said floor of said agitator housing, a frusto-conical shaped diverter hood secured to the top of said inner wall, a solid annular shaped horizontal partition of imperforate material secured to the said inner wall defining upper and lower chambers, a vertically disposed cylindrically shaped duct mounted in the central aperture in said horizontal partition, a blower mounted in the lower portion of said duct, adapted to transfer air from said lower chamber to said upper chamber, said blower having a motor, and a horizontally disposed fan rotatable about a vertical axis, a burner mounted in the upper portion of said duct, an agitator mounted in said agitator housing rotatable about a vertical central axis having a hub, a plurality of arcuate shaped arms, and means to secure said arms to said hub with the outer ends of said arms moving in close but spaced relation to the outer wall of said agitator housing, a frusto-conical shaped hopper having an outlet aperture and mounted in the central aperture of said annular floor of said agitator housing, a generally horizontal tubular shaped conveyor housing connected to the outlet aperture of said hopper, a conveyor auger rotatably mounted in said conveyor housing, a power means for said agitator and conveyor auger comprising, an electric motor, a first shaft mounted adjacent said motor, first belt and pulley means connecting said motor in driving relation to said first shaft, a second shaft, second belt and pulley means connecting said first shaft in driving relation to said second shaft, a first and second pulleys on said second shaft, an agitator drive shaft having a third pulley aligned with said first pulley, a first belt disposed on said first and said third pulleys, an agitator gear box operably connected in driving relationship to said agitator drive shaft and having a vertically disposed driving shaft connected to said hub of said agitator, a conveyor drive shaft having a fourth pulley mounted thereon in alignment with said second pulley, longitudinally spaced universal joints in said conveyor drive shaft, said conveyor drive shaft being connected in driving relation to said conveyor auger, a second belt disposed on said second and fourth pulleys, and a frame means for supporting said motor, said first shaft, said second shaft, said conveyor drive shaft, and said agitator drive shaft, said apparatus for drying grain adapted to dry grain disposed in the annular space between said outer and inner walls with an outwardly directed heated current of air emanating from said upper compartment and a cold current of air being drawn into said lower compartment, and remove the cooled dry grain from the annular space with said agitator, and move the grain outwardly with said conveyor auger.

2. Apparatus for drying grain comprising, a base, upright means mounted on said base, an agitator housing mounted on said upright means and having a cylindrically shaped peripheral wall, and a flat annular shaped floor, an upright perforated cylindrically shaped outer wall secured to said agitator housing, an upright perforated cylindrically shaped inner wall positioned in spaced and concentric relation to said outer wall, means connected to said inner wall and said outer wall to maintain same in rigid spaced relation with the lower end of said inner wall positioned in spaced relation to said floor of said agitator housing, a conical shaped diverter hood mounted on said inner wall, an annular shaped imperforate partition secured to said inner wall forming upper and lower chambers, a vertically disposed cylindrically shaped duct mounted in the central aperture in said partition, a blower mounted in the lower end of said duct adapted to transfer air from said lower to said upper chamber, a burner mounted in the upper portion of said duct, an agitator mounted in said agitator housing rotatable about a vertical central axis having a hub, a plurality of outwardly extending arms, and means to secure said arms to said hub, with the outer ends of said arms moving in close relation to said peripheral wall of said agitator housing, a frusto-conical shaped hopper mounted in the central aperture of said annular floor of said agitator housing, a tubular shaped conveyor housing communicating with the outlet of said hopper, a conveyor auger rotatably mounted in said housing, power means for said agitator and said conveyor auger comprising, a motor, a shaft rotatably mounted adjacent said motor, a first pulley and a second pulley mounted on said shaft, means connecting said motor and said shaft in driving relation, an agitator drive shaft having a third pulley mounted thereon and aligned with said first pulley, a first belt disposed on said first pulley and said third pulley, an agitator gear box operably connected in driving relationship to said agitator drive shaft having a vertically disposed shaft connected to said hub of said agitator, a conveyor drive shaft having a fourth pulley mounted thereon in alignment with said second pulley, universal joint means in said shaft with said conveyor drive shaft being connected in driving relation to said conveyor auger, a second belt disposed on said second and fourth pulleys, and a frame means for supporting said motor, said shaft, said agitator drive shaft, and said conveyor drive shaft, said apparatus for drying grain adapted to dry grain disposed in the annular space between said outer and said inner walls with said blower and burner producing an outwardly directed heated current of air emanating from said upper chamber, and motor drawing a cool drying current of air through the annular space between said outer and inner walls into the lower chamber, and remove the cool dry grain from the annular space with said agitator, and move the grain with said conveyor auger.

3. A drier apparatus comprising, an annular shaped substantially horizontally extended floor, an upright perforated cylindrically shaped outer wall mounted above said annular floor, an upright perforated cylindrically shaped inner wall positioned in spaced and concentric relation to said outer wall with the lower end spaced from said floor, an enclosure hood on said inner wall, an imperforate partition secured to said inner wall defining upper and lower chambers, said partition provided with an aperture therein, a vertically disposed duct mounted in said aperture in said partition, a blower mounted in said duct, a burner mounted in said duct adapted in use to heat air passing through said duct, an agitator rotatable about a vertical central axis positioned in overlying relation to said annular floor, said agitator provided with a hub, and a plurality of substantially horizontally extending arms positioned adjacent said annular floor, a hopper having a material outlet in the lower portion thereof mounted in the central aperture of said annular floor, said arms constructed and adapted to in operation pass and meter material being dried from between said outer and inner walls into said hopper, a conveyor means communicating with the outlet of said hopper having a conveyor auger rotatably mounted therein, a power means for said agitator and said conveyor means comprising, a motor, means connecting said motor and said agitator and conveyor auger in driving relation, said drier apparatus adapted to dry divided material disposed in the annular space between said outer and said inner walls with an outwardly directed heated current of air emanating from the upper one of said chambers, and cool material with an inwardly directed cool current of air drawn into the lower of said compartments, and remove cooled dried grain from the annular space with said auger.

4. A drying apparatus comprising, a floor, an upright perforated outer wall secured to said floor, an upright perforated inner wall positioned in spaced and concentric relation to said outer wall with the bottom end thereof spaced from said floor, an enclosure means on the top of said inner wall, a partition having an aperture therein secured to said inner wall forming upper and lower chambers, a duct means communicating with said aperture in said partition, blower means in said duct, a burner means in said duct, an agitator rotatable about a vertical axis mounted in overlying relation to said floor, said agitator having a hub and a plurality of substantially horizontally extending arms with the outer end portions of said arms adjacent said floor and between said inner and outer walls, and means to rotate said agitator, and a centrally positioned hopper having a material outlet in the lower portion thereof and communicating with the central aperture in said bore, said arms constructed and adapted to in operation pass and meter material being dried from between said outer and inner walls into said hopper, said drying apparatus adapted to dry material disposed between said outer and inner walls with an outwardly directed heated current of air from said upper compartment, and a cool current of air drawn inwardly into said lower compartment, and remove cooled dry grain from the annular space with said agitator.

5. Apparatus for drying grain comprising, a base, upright means mounted on said base, an agitator housing mounted on said upright means having a short upright cylindrically shaped wall, and a flat annular shaped floor, an upright relatively high perforated cylindrically shaped outer wall secured to said wall of said agitator housing, an upright perforated cylindrically shaped inner wall positioned in spaced and concentric relation to said outer wall, said inner wall being of a height less than said outer wall, a plurality of upright circumferentially spaced structural members securing said inner and said outer walls in spaced relation, a conical shaped diverter hood mounted on the top of said inner wall, a vertically disposed cylindrically shaped duct mounted within said inner wall, means supporting said duct in said inner wall, a blower mounted in the lower end of said duct, a burner mounted in the upper portion of said duct, an inlet duct extending through said outer and said inner walls and communicating with said vertically disposed duct, an agitator mounted in said agitator housing rotatable about a vertical axis having a hub and a plurality of extending arms, a frusto-conical shaped hopper having an outlet aperture and mounted in the central aperture of said annular floor of said agitator housing, a tubular shaped conveyor housing in communication with the outlet aperture of said hopper, a conveyor auger rotatably mounted in said conveyor housing, a power means for said agitator and conveyor auger comprising, a motor, a first shaft mounted adjacent said motor, first belt and pulley means connecting said motor in said driving relation to said shaft, a second shaft, second belt and pulley means connecting said first shaft in driving relation to said second shaft, first and second pulleys on said second shaft, an agitator drive shaft having a third pulley mounted thereon and aligned with said first pulley, a first belt disposed on said first and said third pulleys, an agitator gear box operably connected in driving relationship to said agitator drive shaft and having a vertical shaft connected to said hub of said agitator, a conveyor drive shaft having a fourth pulley mounted thereon in alignment with said second pulley, spaced universal joints in said conveyor drive shaft, said conveyor drive shaft being connected in driving relation to said conveyor auger, a second belt disposed on said second and fourth pulleys, and a frame means for supporting said motor, said first shaft, said second shaft, said agitator drive shaft, and said conveyor drive shaft, said drying apparatus adapted to dry grain disposed in the annular space between said outer and inner walls with an outwardly directed heated current of air passing radially outwardly across the space between said inner and outer walls throughout the height of said walls, and remove dry grain from the annular space with said agitator, and move grain with said conveyor auger.

6. A dryer apparatus comprising, a substantially horizontally extended floor, spaced pervious walls adapted to receive therebetween material to be dried and positioned over said floor to direct said material onto said floor, partition means having an aperture therein across the inner one of said walls forming upper and lower chambers, duct means in said partition communicating between said chambers, blower and burner means in said duct means, metering means rotatable about a vertical axis and having a substantially horizontally extending arm with an outer portion adjacent said floor between said spaced walls, means to rotate said metering means, and a centrally positioned hopper having a material outlet in the lower portion thereof and communicating with the space between said spaced walls and said floor, said arm constructed and adapted to in operation pass and meter a material being dried from between said outer and inner walls into said hopper, said dryer apparatus adapted to dry material disposed between said spaced walls with an outwardly directed heated current of air from said upper compartment, and a cool current of air drawn inwardly into said lower compartment, and remove cool dry grain from said hopper through said outlet.

References Cited
UNITED STATES PATENTS

| | | | |
|---|---|---|---|
| 2,654,590 | 10/1953 | Molenaar | 34—65 X |
| 2,925,666 | 2/1960 | Gilmore et al. | 34—174 X |
| 3,233,337 | 2/1966 | Tomlinson | 34—174 X |
| 3,238,640 | 3/1966 | Fry | 34—174 X |

FOREIGN PATENTS 529,901  11/1940  Great Britain.

KENNETH W. SPRAGUE, *Primary Examiner.*